Aug. 16, 1932.   A. H. WAY   1,872,199
PIPE CUTTING DEVICE
Filed Dec. 22, 1930

Arthur H. Way, Inventor
By M. Talbert Dick, Attorney

Patented Aug. 16, 1932

1,872,199

UNITED STATES PATENT OFFICE

ARTHUR H. WAY, OF CANTON, SOUTH DAKOTA

PIPE CUTTING DEVICE

Application filed December 22, 1930. Serial No. 504,071.

The principal object of this invention is to provide a device that will cut large pipes in two evenly and uniformly.

A further object of my invention is to provide a device for cutting pipes that maintains an even pressure on all of its cutting members during the cutting process.

A still further object of my invention is to provide a device for cutting pipes in two that requires only a minimum of swing travel of the operating handle to cut the pipe completely through at all points.

A still further object of the invention is to provide a pipe cutting machine that is easily and quickly attached to or detached from the pipe to be cut.

A still further object is to provide a pipe cutting device that may be easily tightened onto the pipe it is cutting into during the cutting operation.

A still further object of my invention is to provide a device for cutting cylinders in two that is economical in manufacture and durable in use.

These and other objects will be apparent to those skilled in the art.

My invention consists in the construction, arrangement and combination of the various parts of the device, whereby the objects contemplated are attained as hereinafter more fully set forth, pointed out in my claims and illustrated in the accompanying drawing, in which:

The large pipe cutting devices now on the market are not entirely satisfactory as they intermittently exert more pressure on some of the cutting disks than on others during the cutting operation, thereby cutting the pipe ununiformly. Also they do not exert equal force from the operating handle or lever to points diametrically opposite on the collar holding the cutting disks. I have overcome this as will be appreciated by those familiar with the art.

Figure 1:
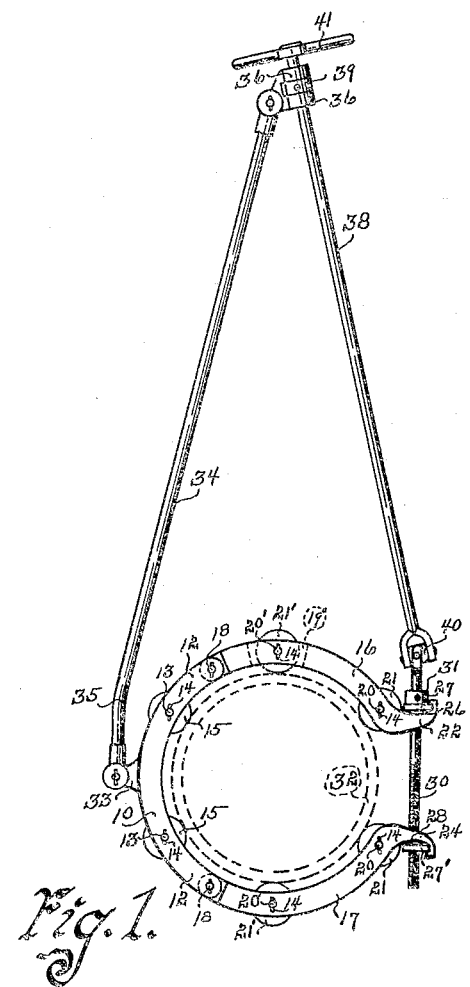
Fig. 1 is a side view of my invention with dotted lines showing the position of the pipe when being cut into.
Figure 2:
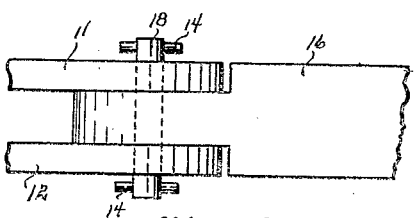
Fig. 2 is a top plan view of a portion of the encircling collar at a point where two of its segments are hinged together.
Figure 3:
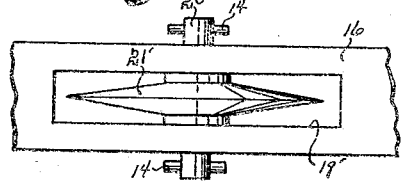
Fig. 3 is a top plan view of a portion of the encircling collar and illustrates the position and arrangement of one of the cutting disks.
Figures 4, 5, 6:
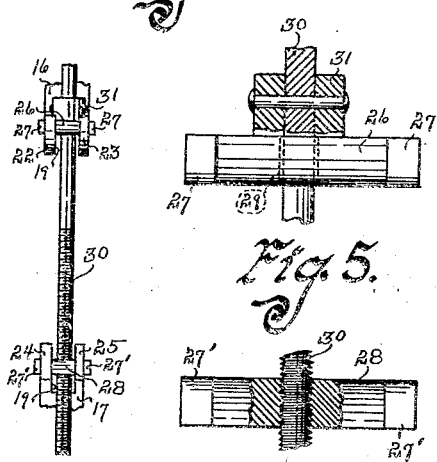
Fig. 4 is a front view of a portion of the devices and shows the method of tightening the collar on or loosening the same from the pipe to be cut.
Fig. 5 is a front view of the upper lug that engages the upper end of the collar with the sleeve and threaded rod shown in section.
Fig. 6 is a front sectional view of the lower lug that engages the lower end of the collar with the tightening rod threaded through it.

I have used the numeral 10 to designate the rear segment of the collar. Each end of this collar is split, thereby providing two parallel, spaced apart and encircling arms 11 and 12 at each end as shown in the drawing. Near the rear ends of each of these two pairs of arms is a shaft 13 extending through the same and held from accidental detachment by pins 14. On each of these shafts is a cutting roller or disk 15 having a diameter of such dimension as to cut a path inside the segment 10, as shown in Fig. 1. The other two segments of the collar I have designated by the numerals 16 and 17, respectively. Each of these two segments 16 and 17 are hinged to the two ends of the segment 10, by having their rear ends extending between the two pairs of arms 11 and 12, respectively, and a shaft 18 passing through each pair of arms and the rear end of the collar segment therein, as shown in Fig. 1. Two spaced apart slots 19 are cut in each of the segments 16 and 17, respectively. These slots are in the same plane as the space between each pair of arms 11 and 12, and the two slots in the extreme two ends of the members 16 and 17 have their forward ends open. Extending through each slot 19 is a shaft 20, a duplicate to the shafts 13 and carrying a cutting roller or disk 21, which is a duplicate of the disk 15. In the rear end portion of each of the members 16 and 17 is an additional slot 19', each carrying the usual shaft designated by the numeral 20' and the cutting disk 21'. Each of these shafts has the usual pins 14.

It should here be noted that these six cutting disks are approximately an equal distance from each other when the collar supporting them is clamped around the pipe to be cut. The shafts 20 are also prevented from accidental detachment by pins 14. Formed on the free end of the segment 16 are two outwardly and upwardly curved claw members 22 and 23. The numerals 24 and 25 designate similar claw members formed on the free end of the segment 17 but curved outwardly and downwardly as shown in Fig. 1.

Figure 7:
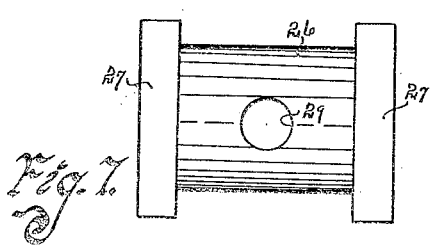
Fig. 7 is a bottom plan view of the upper lug that engages the two claws on the upper end of the collar.

Capable of resting in the claw members 22 and 23 is a lug or bar which I have designated by the numeral 26. This bar has its underside that makes contact with the claw members, rounded as shown in Fig. 7, in order that it may have a certain rotatable action in the claw members. The end portions 27 integrally formed on each end of the bar, lap over the sides of the two claw members, respectively, as shown in the drawing thereby preventing lateral movement of the bar relative to the claw members. The numeral 28 designates a lug or bar member designed to rest in the claw members 24 and 25. This lug or bar member 28 is an exact duplicate of the lug or bar member 26 and similarly rests in the claw members in such a position that its rounded or curved side is adjacent the curved portions of the claw members in which it engages and its ends 27' lap over the outer sides of the claws 24 and 25. Extending through the hole 29, in the bar 26 and threaded into and through the bar 28 is the screw rod 30. Rigidly secured on the screw rod 30 and engaging the top of the bar 26 is the sleeve 31 having an outside diameter larger than that of the inside diameter of the hole 29. By this construction when the rod 30 is rotated to the right, the free ends of the segments 16 and 17 will be drawn together, forcing the disks 15 onto the pipe 32 as shown in Fig. 1, and when the rod 30 is rotated to the left the free ends of the members 16 and 17 may move away from each other, thereby loosening the collar carrying the disks from the pipe. If the rod is rotated to the left sufficiently, the bars may be moved out of engagement with the claw members 22, 23, 24 and 25. When this takes place the segments 16 and 17 may be swung completely out and back on the base segment 10 and the complete device or collar removed from the pipe to be cut or the collar placed around another pipe to be cut.

Extending from the outside of the segment 10 and near the center of its length is the projection 33. Having its lower end hingedly secured to the projection 33 is one of the handle rods 34. This rod is bent at 35 in such a manner that its upper end will be approximately above the collar holding the cutting disks. The numeral 36 designates two bearing members integrally formed together and pivotally secured to the upper end of the handle rod 34. Rotatably mounted in the bearing members 36 is the second handle rod 38 prevented from longitudinal sliding movement in the bearing members 36 by the collar 39 rigidly secured to that rod and located between the bearing members as shown in Fig. 1. This rod 38 extends toward the top of the threaded rod 30 and is connected thereto by a universal joint 40. Rigidly secured against relative movement to the top of the rod 38 is a bar 41 designed to facilitate the manual rotation of the rod 38. As we have seen when the threaded rod 30 is rotated the collar will either be loosened or tightened on the pipe to be cut and by rotating the member 41, naturally the rod 30 will also be rotated as it is operatively connected to the same.

To cut a pipe in two it is merely necessary to tighten the collar on the pipe 32 by rotating the member 41 until the cutting disks engage the periphery of the pipe and oscillate the operating handle rod members 34 and 38 to the right and left. This oscillating of the rods 34 and 38 which really make up a single operating handle member cause the cutting disks to travel around the pipe to be cut and as they do so they will bite into the pipe relative to the force with which they are tightened by the member 41 onto the pipe. Naturally as they cut into the pipe and during the oscillation of the rods 34 and 38, the member 41 should periodically be rotated to the right in order to tighten the collar on the pipe and force the cutting disks into the same.

As all of the cutting disks reside in the same plane, the path they each cut will be a common path running completely around the pipe. As there are six approximately equally spaced apart cutting disks, the collar will only have to be rotated approximately one-sixth of a revolution by the handle member for the cutting disks to cut their particular path into the path cut by the cutting disks adjacent to them. By the two segments 16 and 17 being hingedly secured to the segment 10, the collar will tighten evenly and uniformly onto and around the pipe to be cut when the member 41 is rotated, thereby cutting the pipe successfully at all points and assuring an even pressure being exerted on all of the cutting disks regardless of whether the handle members are moved to the right or left. This would not be true if the segments 16 and 17 were connected to the member 10 by a link or like, as in this case when the handle members were moved in one direction one link would buckle and the other link would tighten, thereby giving an uneven pressure to the various cutting disks. Another feature of this invention that assures the even cutting of the pipe is that there are two handle members, although joined at the top that deliver the operating force to the collar at points approximately diametrically opposite from each other and which is very necessary to the successful functioning of a device of this character. In cutting the pipe the operator should grasp the handle rods 34 and 38 near their outer ends in order to obtain as much leverage as possible. When the device is operated in this manner the member 41 is also very handy for the tightening of the collar on the pipe during the process.

In order that all of the cutting disks will move onto and into the pipe 32 when the member 41 is rotated to the right, it is necessary that these cutting disks be properly positioned on the three piece collar relative not only to themselves but to the pivot points of the collar itself.

In other words when the portions 16 and 17 move toward or away from each other all of the cutting disks must move toward or away from a common center, for otherwise their peripheries would not uniformly engage the pipe to be cut. In further discussing this phase of the invention I will consider the centers of the cutting disks in the measurements of distances rather than the peripheries of the disks. Naturally it will be appreciated if the centers of the cutting disks are properly positioned, it will follow that their peripheries will also be in proper placement. We will start at the pivot point of the base member 10 and the member 16. From this pivot point the cutting disk 15 must be the same distance from this pivot point that the cutting disk 21' is from it. The cutting disk 15 in the lower portion of the base member 10 is a predetermined distance from the cutting disk 15 in the upper portion of the base member 10. This distance between these two cutting disks must be the same as the distance between the two cutting disks 21' and 20 secured to the member 16. Next taking the pivot point of the two members 10 and 17, we have a distance between this point and the cutting disk 15 in the lower end portion of the base member 10 and a distance between this pivot point and the disk 21' in the member 17. These two specific distances are equal and are also equal to the two distances between the pivot point of the base member 10 and the member 16 and the disk 15 in the upper portion of the base member 10 and the disk 21' in the member 16, respectively. Continuing along these same lines the distance between the two cutting disks 15 of the base member 10 should be the same distance as the distance between the two cutting disks 21' and 21 in the member 17.

By such an arrangement the distance between the cutting disk 15 in the lower end portion of the member 10 and the disk 21 in the member 17 would equal the distance between the cutting disk 15 in the upper portion of the base member 10 and the cutting disk 21 in the member 16. The distance between the cutting disk 15 in the lower end portion of the member 10 and the disk 21' in the member 17 will equal the distance between the disk 15 in the upper end portion of the base member 10 and the disk 21' in the rear end portion of the member 16. From this discussion of the placement of the cutting disks not only relative to each other but relative to the pivot points of the three piece collar, it will be appreciated that this specific construction will have to be followed quite closely to produce a device that will successfully and uniformly cut a pipe in two, and will not be materially effected by the slight adjustment of the free ends of the members 16 and 17 toward or away from each other.

Some changes may be made in the construction and arrangement of my improved pipe cutting device without departing from the real spirit and purpose of my invention, and it is my intention to cover by my claims any modified forms of structure or use of mechanical equivalents which may be reasonably included within their scope.

I claim:

1. In a device of the class described, a base member having a circular form, a member secured to each end of said base member also of circular form, a plurality of equally spaced apart cutting disks rotatably mounted on said members of circular form, a bar member engaging the free end of each of said circular members hingedly secured to said base member, a rod passing through one of said bar members and threaded into the other said bar member, an operating rod pivoted to said base member at its center, a bearing member pivotally secured to the other end of said operating rod, a second operating rod rotatably mounted in said bearing member near its top, a handle member secured on the upper end of said second mentioned operating rod to facilitate the manual operation of the same, and a universal joint for operatively connecting said rod passing through said bars and said second mentioned operating rod.

2. In a device of the class described, a base member having a circular form, a member secured to each end of said base member also of circular form, cutting members secured to each of said members having a circular form, a means for moving in two directions the free ends of each of the said circular members that are hingedly secured to said base member, an operating rod secured to said base member, a bearing member secured to the upper end of said operating rod, a second operating rod rotatably mounted in said bearing member, a handle member on said second mentioned operating rod to facilitate the manual rotation of the same, and a means for operatively connecting said first mentioned means with said second mentioned operating rod.

3. In a device of the class described, a base member having a circular form, a member secured to each end of said base member also of circular form, cutting disks rotatably mounted on said members of circular form, a threaded rod operatively connected to the free ends of the said circular members that are hingedly secured to said base member for moving those members toward or away from each other respectively, an operating rod pivoted at its lower end to the central portion of said base member, a bearing member pivotally secured to the other end of said operating rod, a second operating rod rotatably mounted in said bearing member, a handle member secured to the upper end of said second mentioned operating rod to facilitate the manual rotation of the same, and a means for connecting said rod operatively connected to the free ends of said circular members to said second mentioned operating rod.

4. In a device of the class described, a base member having a circular form, a member secured to each end of said base member also of circular form, cutting disks rotatably mounted on said members of circular form, a quickly detachable threaded rod operatively connected to the free ends of the said circular members that are hingedly secured to said base member for moving those members toward or away from each other respectively, an operating rod pivoted at its lower end to the central portion of said base member, a bearing member pivotally secured to the other end of said operating rod, a second operating rod rotatably mounted in said bearing member, a handle member secured to the upper end of said second mentioned operating rod to facilitate the manual rotation of the same, and a means for connecting said rod operatively connected to the free ends of said circular members to said second mentioned operating rod.

ARTHUR H. WAY.